United States Patent
Wang et al.

(10) Patent No.: US 10,705,986 B2
(45) Date of Patent: Jul. 7, 2020

(54) FLASH INTERFACE CONTROLLER AND OPERATION COMMAND PROCESSING METHOD

(71) Applicant: HUAWEI TECHNOLOGIES CO., LTD., Shenzhen, Guangdong (CN)

(72) Inventors: Xianhui Wang, Shenzhen (CN); Rui Huang, Chengdu (CN); You Li, Chengdu (CN)

(73) Assignee: Huawei Technologies Co. Ltd., Shenzhen (CN)

(*) Notice: Subject to any disclaimer, the term of this patent is extended or adjusted under 35 U.S.C. 154(b) by 0 days.

(21) Appl. No.: 16/447,627

(22) Filed: Jun. 20, 2019

(65) Prior Publication Data
US 2019/0303314 A1    Oct. 3, 2019

Related U.S. Application Data

(63) Continuation of application No. PCT/CN2017/103128, filed on Sep. 25, 2017.

(30) Foreign Application Priority Data

Dec. 21, 2016  (CN) .......................... 2016 1 1193064

(51) Int. Cl.
*G06F 12/00*  (2006.01)
*G06F 13/16*  (2006.01)
*G06F 3/06*   (2006.01)

(52) U.S. Cl.
CPC ........ *G06F 13/1668* (2013.01); *G06F 3/0604* (2013.01); *G06F 3/0659* (2013.01); *G06F 3/0679* (2013.01)

(58) Field of Classification Search
CPC .................................. G06F 12/00; G06F 12/02
(Continued)

(56) References Cited

U.S. PATENT DOCUMENTS 8,645,618 B2   2/2014  Somanache et al.
9,201,825 B1   12/2015 Zhou et al.
(Continued)

FOREIGN PATENT DOCUMENTS

CN   103226528 A   7/2013
CN   103226530 A   7/2013

OTHER PUBLICATIONS

PCT International Search Report and Written Opinion in International Application No. PCT/CN2017/103128, dated Nov. 17, 2017, 17 pages(With English translation).

*Primary Examiner* — Titus Wong
(74) *Attorney, Agent, or Firm* — Fish & Richardson P.C.

(57) ABSTRACT

Embodiments of this application provide a flash interface controller and an operation command processing method, and relate to the field of data storage. Programmable first type microcode and second type microcode are introduced to a flash interface controller. The first type microcode can be modified through programming to adapt to a procedure of parsing an operation command of a new protocol, and the second type microcode can be modified through programming to adapt to a flash bus operation required by a new flash interface standard. An operation command can be parsed by only fixing logics of physical modules in the flash interface controller and reading first type microcode and second type microcode that are related to the operation command. Therefore, various protocols and flash interface standards can be adapted to, and flexibility is good.

20 Claims, 5 Drawing Sheets

(58) Field of Classification Search
USPC .............................................................. 710/5
See application file for complete search history.

(56) References Cited

U.S. PATENT DOCUMENTS

| | | | |
|---|---|---|---|
| 2006/0098489 A1* | 5/2006 | Inoue | G11C 16/349 365/185.19 |
| 2009/0077301 A1* | 3/2009 | Brahmadathan | G06F 13/1668 711/103 |
| 2009/0094411 A1* | 4/2009 | Que | G06F 13/385 711/103 |
| 2011/0231724 A1* | 9/2011 | Hara | G06F 11/1068 714/746 |
| 2012/0113721 A1* | 5/2012 | Kim | G11C 7/1045 365/185.12 |
| 2014/0241082 A1* | 8/2014 | Tam | G11C 7/222 365/194 |
| 2016/0267980 A1* | 9/2016 | Akamine | G11C 16/0483 |
| 2017/0169891 A1* | 6/2017 | Griffin | G11C 16/26 |

\* cited by examiner

FLASH INTERFACE CONTROLLER AND OPERATION COMMAND PROCESSING METHOD

CROSS-REFERENCE TO RELATED APPLICATIONS

This application is a continuation of International Application No. PCT/CN2017/103128, filed on Sep. 25, 2017, which claims priority to Chinese Patent Application No. 201611193064.3, filed on Dec. 21, 2016. The disclosures of the aforementioned applications are hereby incorporated by reference in their entireties.

TECHNICAL FIELD

This application relates to the field of data storage, and in particular, to a flash interface controller and an operation command processing method.

BACKGROUND

With the evolution of flash process, a flash protocol standard and a frequency, an interface mode, a timing requirement, and the like of a flash bus interface continuously change. To enable a flash interface controller to adapt to various flashes, a current status of the evolution of a flash technology brings an extremely large challenge to flexible and scalable design of the flash interface controller.

The flash interface controller usually includes a channel management module and a channel. The channel management module distributes an operation command to a corresponding channel. The channel parses the operation command, and sends a bus operation that is finally obtained through the parsing to a flash bus connected to the channel. Each physical flash bus is configured to connect a plurality of flash dies, and a die is a smallest storage unit in a flash.

In the related art, the flash interface controller uses a full-logic implementation or a software implementation when processing the operation command.

In the full-logic implementation, processing logics of physical modules (including the channel management module and modules in the channel) in the flash interface controller are fixed, each physical module uses the fixed processing logic to process a command delivered by a physical module at an upper layer. In this manner, the processing logics of all physical modules are fixed in advance, and when a protocol of the operation command changes, a procedure of parsing the operation command also changes. As a result, the physical module whose processing logic is fixed cannot adapt to an operation command of a latest protocol, and therefore has poor flexibility.

In the software implementation, a micro-central processing unit (CPU for short) is added to the channel management module in the flash interface controller. When the protocol of the operation command changes, a software logic in the CPU can be modified. The operation command is parsed by using a software logic that is obtained after the modification and that adapts to the latest protocol. An instruction obtained after the parsing is delivered to the physical modules in the channel. The physical modules in the channel still perform processing based on the processing logics that are fixed in advance. The CPU needs to participate in parsing of each operation command. Therefore, in an application scenario of concurrency of a plurality of channels and a plurality of dies, there is a very high requirement on performance of the CPU, and a plurality of CPUs may need to perform concurrent processing. However, the plurality of CPUs cause relatively large power consumption and area costs. In addition, a bus operation that is finally obtained through the parsing in the channel needs to meet a flash bus interface standard. When the flash bus interface standard changes, the fixed processing logic in the channel cannot adapt to the flash bus interface standard, still causing poor flexibility.

SUMMARY

To resolve a problem in the related art that requirements of a new protocol and a flash bus interface standard cannot be satisfied after a processing logic of a physical module in a flash interface controller is fixed, embodiments of this application provide a flash interface controller and an operation command processing method. The technical solutions are as follows:

According to a first aspect, a flash interface controller is provided. The flash interface controller includes a channel management module (Channel Manager), a channel, a command buffering management module (Command Buffer Manager), a data buffering management module (Data Buffer Manager), a NAND config storage (Nand Config Storage, NCS for short) memory storage module, and a programmable timing generator (PTG for short) memory storage module. Each channel includes a die concurrent schedule (DCS for short) module, a flash access agent (FAA for short) module, a PTG module, and a physical layer interface (PHY for short) module.

The channel management module is configured to allocate, based on a channel number in a received operation command, the operation command to a channel corresponding to the channel number.

The DCS module in the channel is configured to: store the received operation command to the command buffering management module; and send a scheduled operation command to the FAA module.

The FAA module is configured to: obtain a command parameter of the operation command from the command buffering management module after receiving the operation command; read, based on a NAND config storage NCS memory location indicated by the command parameter, first type microcode starting from the NCS memory location in the NCS memory storage module, and execute the first type microcode; and send an index command obtained after executing the first type microcode to the PTG module.

The PTG module is configured to: read second type microcode from a location that corresponds to the index command and that is in the PTG memory storage module, and execute the second type microcode; and send a flash bus operation obtained after executing the second type microcode to the physical layer interface module.

The physical layer interface module is configured to send the flash bus operation to a flash bus.

The programmable first type microcode and second type microcode are introduced to the flash interface controller. The first type microcode can be modified through programming to adapt to a procedure of parsing an operation command of a new protocol, and the second type microcode can be modified through programming to adapt to a flash bus operation required by a new flash interface standard. An operation command can be parsed by only fixing logics of physical modules in the flash interface controller and reading first type microcode and second type microcode that are related to the operation command, and a flash bus operation obtained through the parsing meets the flash interface standard. Therefore, various protocols and flash interface standards can be adapted to, and flexibility is good.

In a first possible implementation of the first aspect, the channel management module includes a channel management unit and a low power processing unit. The channel management unit is configured to allocate, based on the channel number in the received operation command, the operation command to the channel corresponding to the channel number. The processing unit is configured to deliver a customized command to the DCS module in the corresponding channel.

The channel management module is provided with a low power processing unit. In a special case, a customized special command can be delivered to the channel, to satisfy some special requirements. In addition, the low power processing unit occupies a relatively small area, thereby avoiding unnecessary enlargement of an area occupied by the flash interface controller.

With reference to the first aspect or the first possible implementation of the first aspect, in a second possible implementation, the processing unit is further configured to: directly deliver the customized command to the DCS module in the corresponding channel when determining that the customized command is unrelated to a die corresponding to another operation command; and when determining that the customized command is related to the die corresponding to the another operation command, deliver the customized command to the DCS module in the corresponding channel after the operation command related to the customized command is executed.

When determining that the customized command is related to the die of the another operation command, the processing unit delivers the customized command to a DCS module in a corresponding channel only after all the operation commands are executed, thereby ensuring accuracy of performing an operation on the die by using the customized command.

With reference to the first aspect, the first possible implementation of the first aspect, or the second possible implementation of the first aspect, in a third possible implementation, the DCS module includes at least one command distribution queue group, each command distribution queue group includes a high-priority command distribution queue and a low-priority command distribution queue, and a command stored in the high-priority command distribution queue in the same command distribution queue group is preferentially scheduled; and the channel management module is further configured to: determine, based on a priority of the operation command and execution results that are of the operation commands and that are fed back by the DCS module, a target command distribution queue in the DCS module that matches the priority of the operation command and that has a storage location; and allocate the operation command to the target command distribution queue.

The DCS module is provided with command distribution queues of different priorities, and the channel management module may allocate a high-priority operation command to the high-priority command distribution queue of the DCS module, thereby ensuring that the high-priority operation command can be preferentially scheduled.

With reference to any one of the first aspect, or the first possible implementation of the first aspect to the third possible implementation of the first aspect, in a fourth possible implementation, the DCS module includes a group of result return queues, the result return queue includes a high-priority result return queue and a low-priority result return queue, and an execution result of a command stored in the high-priority result return queue is preferentially reported to the channel management module.

By storing an execution result of the high-priority operation command to the high-priority result return queue, an upper layer can learn of the execution result of the high-priority operation command as fast as possible.

With reference to any one of the first aspect, or the first possible implementation of the first aspect to the fourth possible implementation of the first aspect, in a fifth possible implementation, when the operation command is a write command, the FAA module is further configured to send a read request corresponding to the operation command to a data access controller, where the read request is used to trigger the data access controller to read data corresponding to the operation command from a data storage medium and return the read data to the FAA module; and the FAA module is further configured to store the data obtained by the data access controller to the data buffering management module.

With reference to any one of the first aspect, or the first possible implementation of the first aspect to the fifth possible implementation of the first aspect, in a sixth possible implementation, when the operation command is a read command, the FAA module is further configured to: store data that corresponds to the operation command and that is read by the PTG module from the flash to the data buffering management module; read the data corresponding to the operation command from the data buffering management module; and send a write request carrying the data to the data access controller, where the write request is used to trigger the data access controller to write the data into the data storage medium.

With reference to any one of the first aspect, or the first possible implementation of the first aspect to the sixth possible implementation of the first aspect, in a seventh possible implementation, the FAA module is further configured to: when the operation command is in an operation busy time, store an intermediate state of the operation command and a currently read NCS memory location of the first type microcode as command parameters of the operation command to the command buffering management module; and the FAA module is further configured to: when the operation command is scheduled again, obtain the previously-recorded NCS memory location of the operation command from the command buffering management module; continue to read the first type microcode starting from the NCS memory location in the NCS memory storage module, and execute the first type microcode; and when all first type microcode that corresponds to the operation command is executed, obtain a command result of the operation command and return the command result to the DCS module.

The FAA module may store the currently read NCS memory location of the microcode as the command parameter of the operation command to the command buffering management module when the operation command is in the operation busy time, so that when the operation command is scheduled again, the previously-recorded NCS memory location of the operation command can be read from the command buffering management module, to continue to read and execute remaining microcode, thereby avoiding to repeatedly execute the microcode that has been executed, and ensuring a speed of executing microcode of the operation command.

With reference to any one of the first aspect, or the first possible implementation of the first aspect to the seventh possible implementation of the first aspect, in an eighth possible implementation, the physical layer interface module is further configured to: determine whether the received flash bus operation is a bus operation of a non-double data rate (DDR for short) interface; and send the flash bus operation to the flash bus when the received flash bus operation is a bus operation of a non-DDR interface; or when the received flash bus operation is a bus operation of a DDR interface, convert the flash bus operation into double data rate data and send the double data rate data to the flash bus.

With reference to any one of the first aspect, or the first possible implementation of the first aspect to the eighth possible implementation of the first aspect, in a ninth possible implementation, the first type microcode stored in the NCS memory storage module and the second type microcode stored in the PTG memory storage module are configured during power on, the first type microcode matches the command parameter of the operation command, and the second type microcode matches a parameter required by a flash bus interface.

The first type microcode can match the command parameter of the operation command. When a protocol of the operation command changes, the first type microcode is modified based on only a command parameter of the operation command whose protocol changes, thereby implementing flexible adaption to the protocol. In addition, the second type microcode can match a parameter required by the flash bus interface. When a flash bus interface standard changes, the second type microcode is modified based on only the parameter required by the flash bus interface, thereby implementing flexible adaption to the flash bus interface standard.

According to a second aspect, an operation command processing method is provided. The operation command processing method is applied to a flash interface controller. The flash interface controller includes: a channel management module, a channel, a command buffering management module, a data buffering management module, a die concurrent schedule DCS memory storage module, and a programmable timing generator PTG memory storage module. The channel includes a DCS module, a flash access agent FAA module, a PTG module, and a physical layer interface module. The method includes: allocating, by the channel management module based on a channel number in a received operation command, the operation command to a channel corresponding to the channel number; storing, by the DCS module in the channel, the received operation command to the command buffering management module; and sending a scheduled operation command to the FAA module; obtaining, by the FAA module, a command parameter of the operation command from the command buffering management module after receiving the operation command; reading, based on a NAND config storage NCS memory location indicated by the command parameter, first type microcode starting from the NCS memory location in the NCS memory storage module, and executing the first type microcode; and sending an index command obtained after executing the first type microcode to the PTG module; reading, by the PTG module, second type microcode from a location that corresponds to the index command and that is in the PTG memory storage module, and executing the second type microcode; and sending a flash bus operation obtained after executing the second type microcode to the physical layer interface module; and sending, by the physical layer interface module, the flash bus operation to a flash bus.

In a first possible implementation of the second aspect, the channel management module includes a channel management unit and a low power processing unit, and the allocating, by the channel management module based on a channel number in a received operation command, the operation command to a channel corresponding to the channel number includes: allocating, by the channel management unit based on the channel number in the received operation command, the operation command to the channel corresponding to the channel number; and the method further includes:

delivering, by the processing unit, a customized command to the DCS module in the corresponding channel.

With reference to the second aspect or the first possible implementation of the second aspect, in a second possible implementation, the method further includes: directly delivering, by the processing unit, the customized command to the DCS module in the corresponding channel when determining that the customized command is unrelated to a die corresponding to another operation command; and when determining that the customized command is related to the die corresponding to the another operation command, delivering, by the processing unit, the customized command to the DCS module in the corresponding channel after the operation command related to the customized command is executed.

With reference to the second aspect, the first possible implementation of second aspect, or the second possible implementation of the second aspect, in a third possible implementation, the DCS module includes at least one command distribution queue group, each command distribution queue group includes a high-priority command distribution queue and a low-priority command distribution queue, and a command stored in the high-priority command distribution queue in the same command distribution queue group is preferentially scheduled; and the method further includes: determining, by the channel management module based on a priority of the operation command and execution results that are of the operation commands and that are fed back by the DCS module, a target command distribution queue in the DCS module that matches the priority of the operation command and that has a storage location; and allocating the operation command to the target command distribution queue.

With reference to aspect to the third possible implementation of the second aspect, in a fourth possible implementation, the DCS module includes a group of result return queues, the result return queue includes a high-priority result return queue and a low-priority result return queue, and an execution result of a command stored in the high-priority result return queue is preferentially reported to the channel management module.

With reference to any one of the second aspect, or the first possible implementation of the second aspect to the fourth possible implementation of the second aspect, in a fifth possible implementation, the method further includes: when the operation command is a write command, sending, by the FAA module, a read request corresponding to the operation command to a data access controller, where the read request is used to trigger the data access controller to read data corresponding to the operation command from a data storage medium and return the read data to the FAA module; and storing, by the FAA module, the data obtained by the data access controller to the data buffering management module.

With reference to any one of the second aspect, or the first possible implementation of the second aspect to the fifth possible implementation of the second aspect, in a sixth possible implementation, the method further includes: when the operation command is a read command, storing, by the FAA module, data that corresponds to the operation command and that is read by the PTG module from the flash to the data buffering management module; reading the data corresponding to the operation command from the data buffering management module; and sending a write request carrying the data to the data access controller, where the write request is used to trigger the data access controller to write the data into the data storage medium.

With reference to any one of the second aspect, or the first possible implementation of the second aspect to the sixth possible implementation of the second aspect, in a seventh possible implementation, when the operation command is in an operation busy time, storing, by the FAA module, an intermediate state of the operation command and a currently read NCS memory location of the first type microcode as command parameters of the operation command to the command buffering management module; and when the operation command is scheduled again, obtaining, by the FAA module, the previously-recorded NCS memory location of the operation command from the command buffering management module; continuing to read the first type microcode starting from the NCS memory location in the NCS memory storage module, and executing the first type microcode; and when all first type microcode that corresponds to the operation command is executed, obtaining a command result of the operation command and returning the command result to the DCS module.

With reference to any one of the second aspect, or the first possible implementation of the second aspect to the seventh possible implementation of the second aspect, in an eighth possible implementation, the method further includes: determining, by the physical layer interface module, whether the received flash bus operation is a bus operation of a double data rate DDR interface; and sending the flash bus operation to the flash bus when the received flash bus operation is a bus operation of a non-DDR interface; or when the received flash bus operation is a bus operation of a DDR interface, converting the flash bus operation into double data rate data and sending the double data rate data to the flash bus.

With reference to any one of the second aspect, or the first possible implementation of the second aspect to the eighth possible implementation of the second aspect, in a ninth possible implementation, the method further includes: the first type microcode stored in the NCS memory storage module and the second type microcode stored in the PTG memory storage module are configured during power on, the first type microcode matches the command parameter of the operation command, and the second type microcode matches a parameter required by a flash bus interface.

According to a third aspect, a computer-readable storage medium is provided, where the storage medium stores at least one instruction, and the instruction is loaded by a flash interface controller and is used to perform the operation command processing method according to any one of the second aspect or the possible implementations of the second aspect.

DESCRIPTION OF EMBODIMENTS

To make the objectives, technical solutions, and advantages of this application clearer, the following further describes the implementations of this application in detail with reference to the accompanying drawings.

During actual application, a command management module (for example, a CPU) of a device can perform a corresponding operation (for example, a read operation, a write operation, and an erase operation) on a flash. In this case, the command management module needs to send an operation command to a flash interface controller. The flash interface controller parses the operation command to finally obtain a flash bus operation corresponding to a flash interface standard, and sends the flash bus operation to a flash bus, so that the flash performs a related operation.

Parsing procedures of the operation command are different in different protocols. Therefore, to parse the operation command delivered by the command management module, an operation logic corresponding to a current protocol needs to be fixed in advance in a physical module in the flash interface controller, so that the operation logic can be used to parse an operation command of the current protocol. However, during actual application, different vendors may use different protocols, and consequently in the flash interface controller, an operation logic that is fixed for a specific protocol cannot be used for parsing an operation command of another protocol.

In addition, after parsing the operation command, the flash interface controller needs to send the flash bus operation obtained through the parsing to the flash bus, and there may be different standards for a flash bus interface. Therefore, the flash bus operation obtained by parsing the operation command by using the fixed operation logic in the flash interface controller may not satisfy a flash bus interface requirement.

To enable the flash interface controller to adapt to different parsing protocols and different flash bus interface standards, an embodiment of this application provides a flash interface controller having two levels of microcode. A processing unit (that is, a microcode controller) is embedded in each flash channel of the flash interface controller, satisfying interface flexibility for a future medium characteristic change while considering requirements for performance, area, and power consumption. Each channel in the flash interface controller includes two levels of codable microcode modules (an NCS memory storage module and a PTG memory storage module). Command pipeline processing is performed in the solution, to support concurrent processing of a plurality of flash dies. Each level of microcode is implemented by using a logic, and latency and the power consumption is low, satisfying requirements of continuously evolved flash characteristics and performance.

The following describes the flash interface controller with reference to FIG. 1 to FIG. 4.

Figure 1:
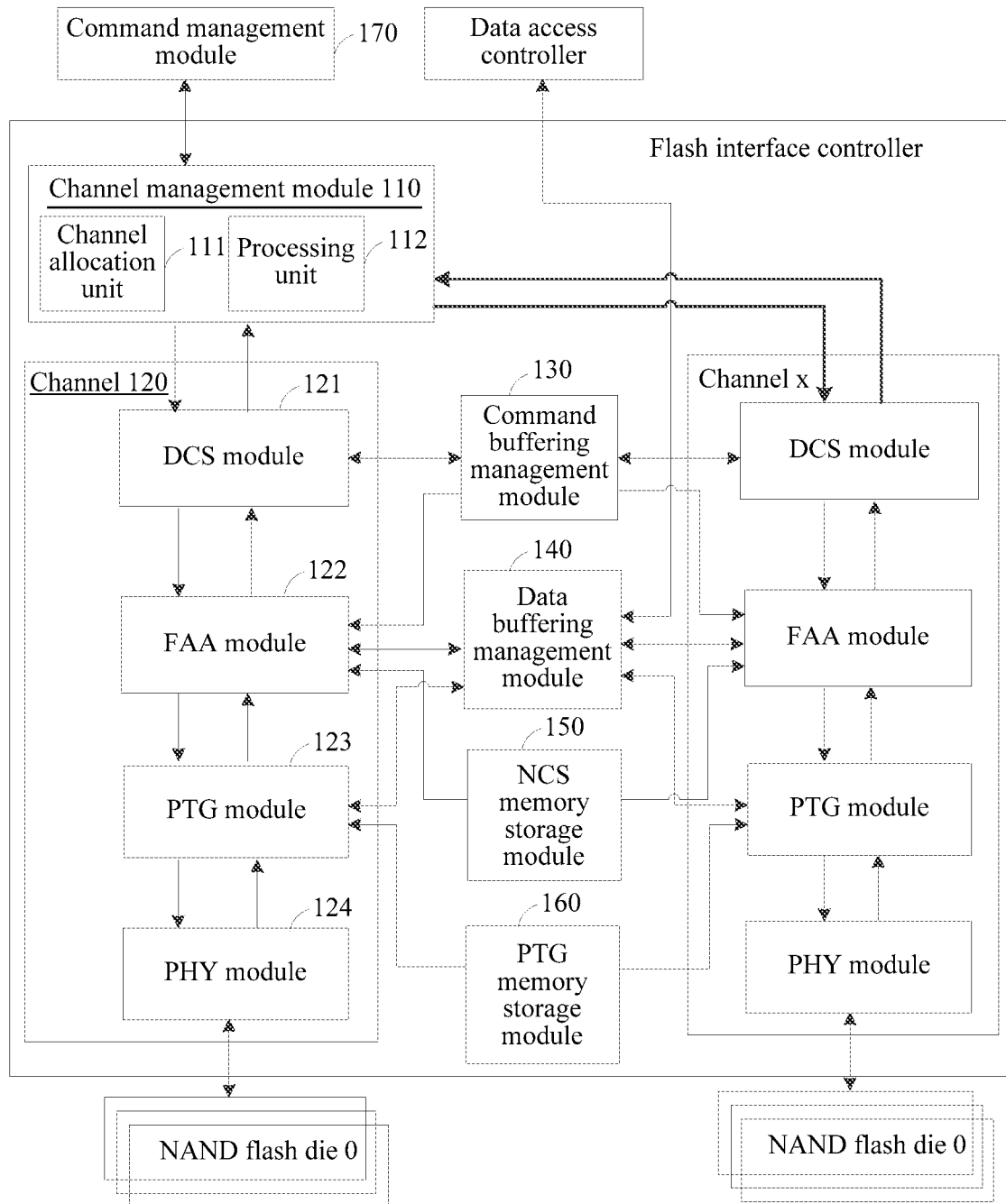
FIG. 1 is a schematic structural diagram of a flash interface controller according to some embodiments of this application.

FIG. 1 is a schematic structural diagram of a flash interface controller according to some embodiments of this application. The flash interface controller includes a channel management module 110, at least one channel 120, a command buffering management module 130, a data buffering management module 140, an NCS memory storage module 150, and a PTG memory storage module 160.

Each channel 120 includes a DCS module 121, an FAA module 122, a PTG module 123, and a physical layer interface (PHY) module 124.

The channel management module 110 is configured to allocate, based on a channel number in an operation command, the operation command to a channel 120 corresponding to the channel number. The operation command is delivered by an upper layer, for example, a command management module 170 shown in FIG. 1. The command management module 170 described herein may be a central processing unit of a device. Optionally, the operation command may further include a die address in addition to the channel number. Usually, the die address is an address of a die in a flash to which the channel corresponding to the channel number is connected.

The operation command described herein may be a read command, a write command, and an erase command.

Optionally, the channel management module 110 includes a channel allocation unit 111 and a processing unit 112. The processing unit 112 may be a microprocessor, for example, a low power CPU.

For a command that needs to be specially processed, for example, a read operation failure, a write operation failure, and an erase operation failure for which the processing unit 112 needs to perform exceptional intervention, in this case, the channel management module 110 also supports sending of a small quantity of customized commands by using the processing unit 112 to a corresponding channel for execution.

The DCS module 121 in the channel 120 stores the operation command to the command buffering management module 130 after receiving the operation command allocated by the channel management module 110.

After storing the operation command to the command buffering management module 130, the DCS module 121 may schedule a plurality of operation commands that are currently stored, and select one of the operation commands and send the operation command to the FAA module 122.

The FAA module 122 obtains a command parameter of the operation command from the command buffering management module 130 after receiving the operation command. The command parameter described herein may further include an NCS memory location corresponding to the current operation command and a customized parameter in addition to a general parameter related to an address and data. The FAA module 122 reads, based on the NCS memory location indicated by the command parameters, first type microcode stored in the NCS memory storage module 150, and executes the first type microcode; and sends an index command obtained by executing the first type microcode to the PTG module 123.

Usually, different operation commands direct to different NCS memory locations, but operation commands of a same type direct to a same NCS memory location.

An operation performed by the FAA module 122 is described below based on different operation commands.

Using the erase command as an example, the FAA module 122 reads, based on an NCS memory location indicated by the erase command, first type microcode starting from the NCS memory location in the NCS memory storage module 150, and executes the read first type microcode. The current erase command is parsed into an index (for example, a command index and an address index) corresponding to the PTG module 123 and the index is sent to the PTG module 123. If the executed first type microcode is in an erase flash block busy time, an intermediate state of the currently executed erase command and an NCS memory location from which the erase command starts to be executed next time need to be stored to the command buffering management module 130, to wait for next scheduling by the DCS module 121. If the current operation command is scheduled again, the FAA module 122 executes subsequent first type microcode starting from the previously-recorded NCS memory location of the operation command, until all first type microcode is erased. The FAA module 122 obtains an execution result of the erase command and returns the result to the DCS module 121. The DCS module 121 reports the result to the command management module 170, to notify that the erase command is executed.

Then using the read command as an example, the FAA module 122 reads, based on an NCS memory location indicated by the read command, first type microcode starting from the NCS memory location in the NCS memory storage module 150, and executes the read first type microcode. The current read command is parsed into an index (for example, a command index, an address index, and a read flash data index) corresponding to the PTG module 123 and the index is sent to the PTG module 123, and a write request carrying data is sent to a data access controller. If the executed first type microcode is in a read flash page busy time, an intermediate state of the currently executed read command and an NCS memory location from which the read command starts to be read next time need to be stored to the command buffering management module 130, to wait for next scheduling by the DCS module 121 next time. If the current operation command is scheduled again, the FAA module 122 executes subsequent first type microcode starting from the previously-recorded NCS memory location of the operation command, until all first type microcode of the read command is executed. The FAA module 122 obtains an execution result of the read command and returns the result to the DCS module 121. The DCS module 121 reports the result to the command management module 170, to notify that the read command is executed.

Then using the write command as an example, the FAA module 122 reads, based on an NCS memory location indicated by the write command, first type microcode starting from the NCS memory location in the NCS memory storage module 150, and executes the read first type microcode. The current write command is parsed into an index (for example, a command index, an address index, and a write flash data index) corresponding to the PTG module 123 and the index is sent to the PTG module 123, and a corresponding read request is sent to the data access controller. If the executed first type microcode is in a program flash page busy time, an intermediate state of the currently executed write command and an NCS memory location from which the write command starts to be read next time need to be stored to the command buffering management module 130, to wait for next scheduling by the DCS module 121. If the current operation command is scheduled again, the FAA module 122 executes subsequent first type microcode starting from the previously-recorded NCS memory location of the operation command, until all first type microcode of the write command is executed. The FAA module 122 obtains an execution result of the write command and returns the result to the DCS module 121. The DCS module 121 reports the result to the command management module 170, to notify that the write command is executed.

Then using the customized command as an example, the FAA module 122 reads, based on an NCS memory location in a customized command delivered by the processing unit 112, first type microcode starting from the NCS memory location in the NCS memory storage module 150, and executes the read first type microcode. A parameter carried in the customized command is parsed by using the read first type microcode, and the customized command is parsed into an index (for example, a command index, an address index, a write flash data index, and a read flash data index) corresponding to the PTG and the index is sent to the PTG module 123, and a corresponding read flash data DMA command and a corresponding write flash data DMA command are sent to a DMA controller. If the executed first type microcode is in a flash busy time, an intermediate state of the currently executed customized command and an NCS memory location from which the write command starts to be read next time need to be stored to the command buffering management module 130, to wait for next scheduling by the DCS module 121. If the operation command of the current die is scheduled again, the FAA module 122 executes subsequent first type microcode starting from the previously-recorded NCS memory location, until all first type microcode of the customized command is executed. The FAA module 122 obtains an execution result of the customized command and returns the result to the DCS module 121. The DCS module 121 reports the result to the command management module 170, to notify that the customized command is executed.

The PTG module 123 receives an index delivered by the FAA module 122, reads corresponding second type microcode based on a PTG memory location corresponding to the index, and executes the read second type microcode. Based on an instruction for a flash bus operation stored in the read second type microcode, content in each PTG index is converted into the flash bus operation and the flash bus operation is sent to the flash PHY module 124.

The flash PHY module 124 determines whether the received flash bus operation is a double data rate (DDR for short) synchronous dynamic random access memory interface operation, directly sends a flash bus operation of a non-DDR interface operation to the flash bus, and converts a DDR interface operation into double-edge data and sends the double-edge data to the flash bus.

The first type microcode stored in the NCS memory storage module 150 and the second type microcode stored in the PTG memory storage module 160 are only configured once during power on. Each channel has only an interface for reading the first type microcode and the second type microcode, and a plurality of channels can share one NCS memory storage module 150 and one PTG memory storage module 160 based on a performance requirement.

In conclusion, in the flash interface controller provided in this embodiment of this application, the operation command is scheduled by using the DCS module, the FAA module may read first type microcode in the NCS memory storage module corresponding to the scheduled operation command, and parses the operation command by using the first type microcode. When the operation command changes as a protocol is modified, only the first type microcode in the NCS memory storage module corresponding to the operation command needs to be modified, and logics of the DCS module and the FAA module do not need to be modified, so that the flash interface controller can adapt to operation commands of various protocols.

In addition, the PTG module can read, from the PTG memory storage module, second type microcode corresponding to an index output by the FAA module, and parse the index by using the second type microcode, to obtain a flash bus operation and send the flash bus operation to the flash PHY module. The flash PHY module directly sends a flash bus operation of a non-DDR interface to the flash bus, and converts a DDR interface operation into double-edge data and sends the double-edge data to the flash bus. When a physical layer interface of a flash is changed, only the second type microcode in the PTG memory storage module needs to be modified, and a logic of the PHY module of the flash does not need to be modified, so that the flash interface controller can adapt to the flash whose physical layer interface is changed.

Figure 2:
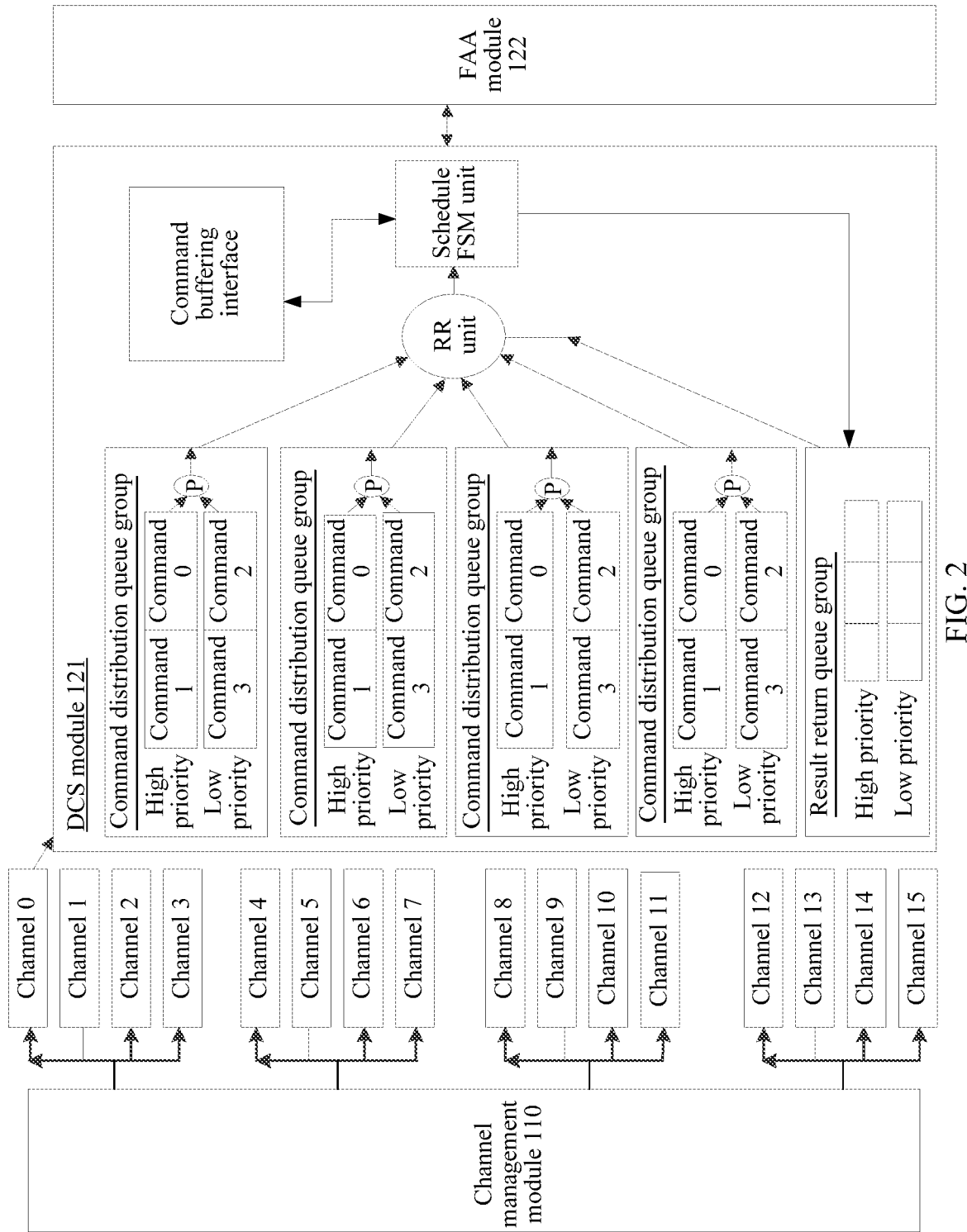
FIG. 2 is a schematic structural diagram of a DCS module according to an embodiment of this application.
Figure 3:
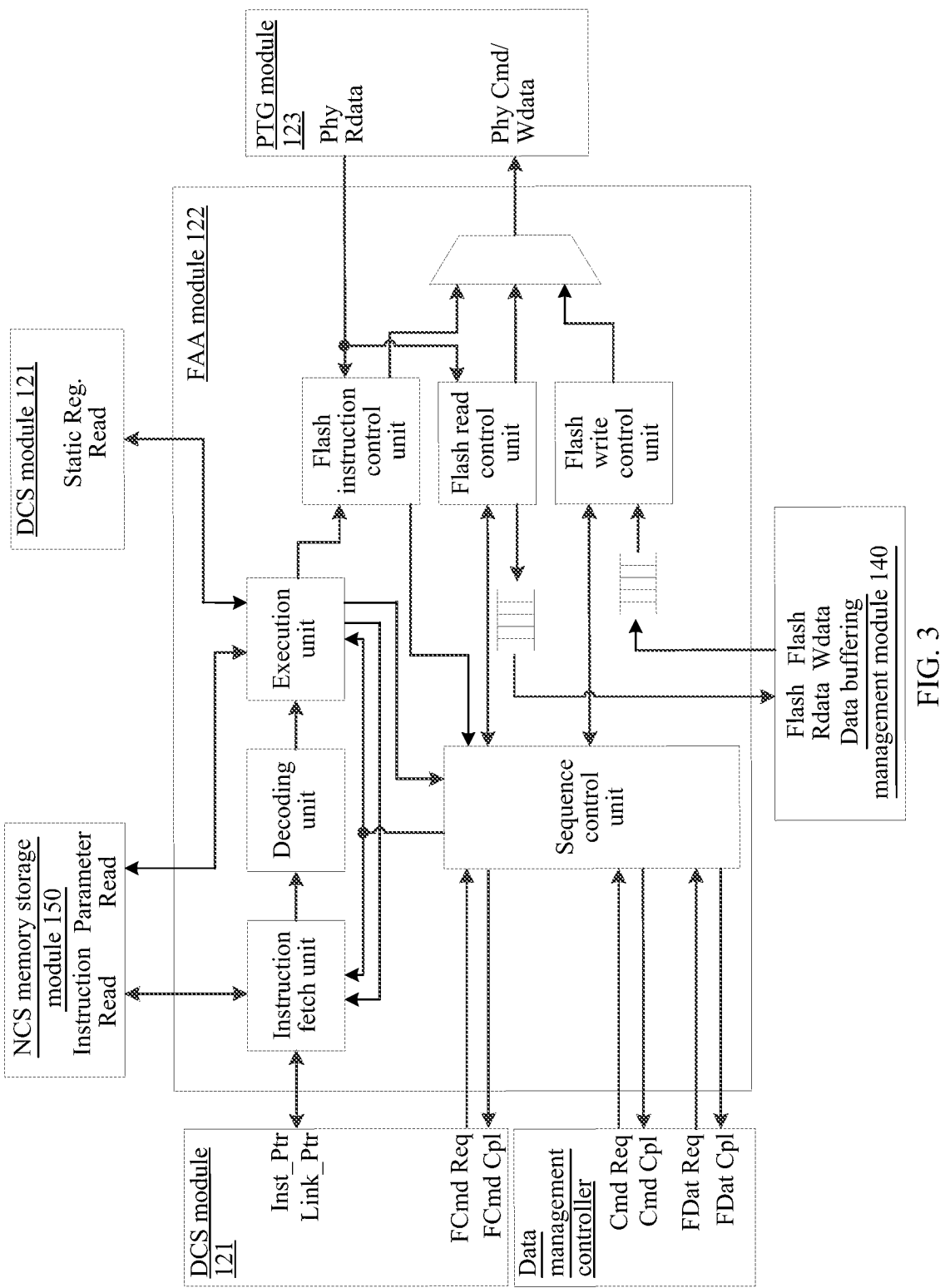
FIG. 3 is a schematic structural diagram of an FAA module according to an embodiment of this application.
Figure 4:
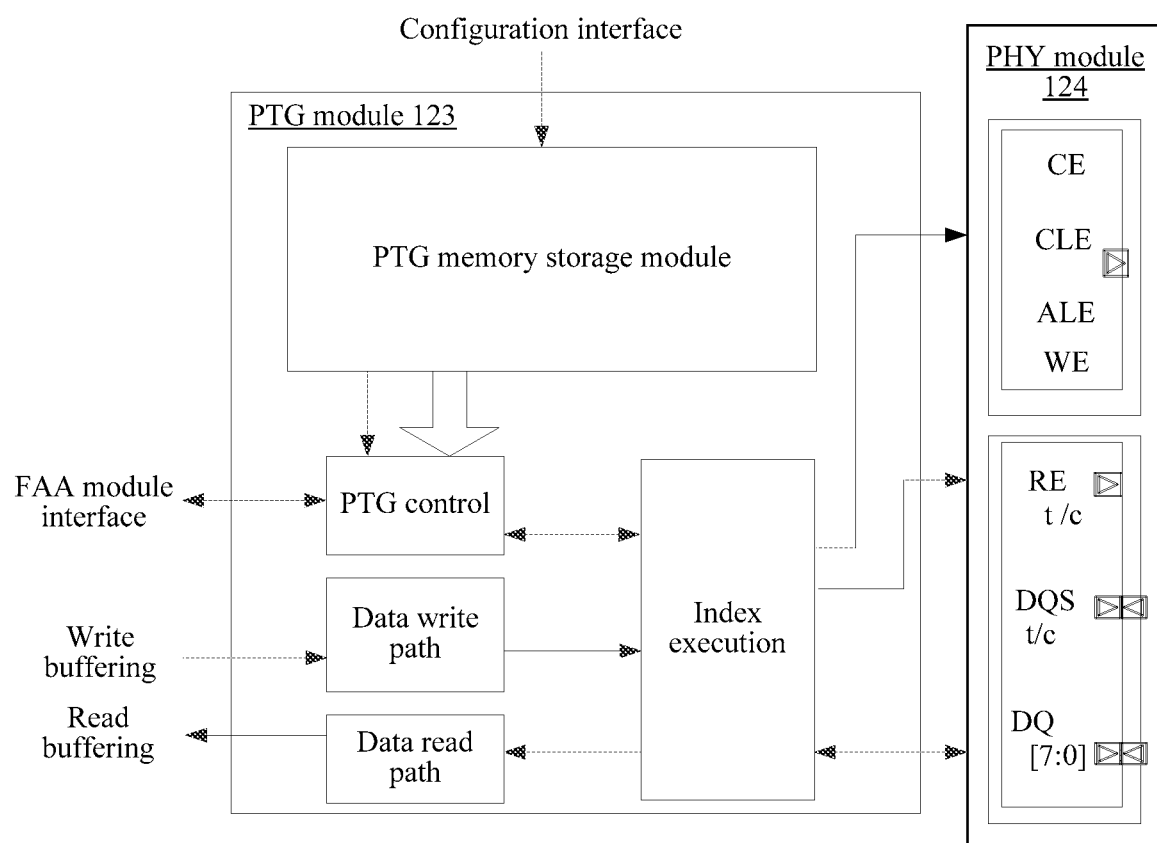
FIG. 4 is a schematic structural diagram of a PTG module according to an embodiment of this application.

To further understand a procedure of parsing an operation command by the channel, the following separately explains a DCS module 121, a FAA module 122, and a PTG module 123 in the channel with reference to FIG. 2, FIG. 3, and FIG. 4.

FIG. 2 is a schematic structural diagram of a DCS module according to an embodiment of this application.

The DCS module 121 is implemented by using a combination of software and hardware. A low power processing unit and a hardware acceleration logic control scheduling of a plurality of flash channels and a plurality of operation commands, to implement functions such as command priority sorting, command context management, command latch, and flash mode switching. A complex scheduling algorithm is managed by software, and high performance input/output scheduling is implemented by using a fixed acceleration logic in a physical module, thereby considering both characteristics of high software flexibility and high logical implementation performance.

In FIG. 2, the DCS module 121 has at least one command distribution queue group and a result return queue group 121b.

Each command distribution queue group includes a high-priority command distribution queue and a low-priority command distribution queue. The command distribution queue is used to store an operation command delivered by an upper layer. To be specific, a command in a high-priority distribution queue in each command distribution queue group is preferentially scheduled. That is, in a same command distribution queue group, commands in a low-priority command distribution queue are scheduled only after all commands in a high-priority command distribution queue are scheduled. However, command distribution queue groups are concurrently scheduled without a sequence.

During command distribution, the channel management module 110 determines, based on a priority of the operation command and execution results that are of the operation commands and that are fed back by the DCS module 121, a target command distribution queue in the DCS module 121 that matches the priority of the operation command and that has a storage location; and allocates the operation command to the target command distribution queue.

During actual application, for a NAND flash, there are a plurality of corresponding channels in the flash interface controller, for example, a channel 0 to a channel 15 shown in FIG. 2, and each channel corresponds to several dies of the flash. The channel management module 110 in the flash interface controller distributes, based on channel numbers of the operation commands, the operation commands to channels corresponding the channel numbers. For example, when a channel number of an operation command is 0, the operation command is sent to the channel 0.

The channel management module 110 distributes the operation command to a command distribution queue corresponding to the DCS module 121, and can learn of an execution result of the operation command reported by the DCS module 121, and the channel management module 110 determines, based on a historically-stored operation command and the returned execution result, whether each command distribution queue in the DCS module 121 is idle or is empty. An idle command distribution queue indicates that there is stored idle space that can store an operation command, and an empty command distribution queue indicates that no operation command is stored.

In this way, when determining that a priority of an operation command that needs to be delivered is relatively high, the channel management module 110 first determines a high-priority command distribution queue that can still store more operation commands. When there is one high-priority command distribution queue determined, the command distribution queue is used as the target command distribution queue, and the operation command is pushed to the target command distribution queue.

When there are at least two high-priority command distribution queues determined, one of the command distribution queues is randomly used as the target command distribution queue, and the operation command is pushed to the target command distribution queue. Alternatively, when there are at least two high-priority command distribution queues determined, one of empty command distribution queues is used as the target command distribution queue, and the operation command is pushed to the target command distribution queue.

The channel management module 110 includes software management and hardware acceleration. For a common operation command, a distribution right may be performed by the fixed acceleration logic in the channel management unit 111, to satisfy a high performance requirement. For a special customized command that needs to be specially processed, for example, command latch, flash mode switching, and flash private instruction, the processing unit 112 is required.

To ensure that the command delivered by the processing unit 112 can be scheduled relatively quickly, depth of each command distribution queue in the DCS module 121 may be set to be smaller. For example, the depth of each command distribution queue is set to 2. To be specific, each command distribution queue can store only two commands. In this way, after executing the operation command in the command distribution queue, the processing unit 112 can very quickly stop another operation command that needs to be allocated, and allocate a customized special command to the command distribution queue in the DCS module 121. For a command that is sent to the DCS module 121, a fixed logic needs to perform concurrency, scheduling, and context management on the operation command based on a highest performance requirement.

During actual application, to avoid that the customized command affects another operation command, when allocating the customized command, the processing unit first determines whether the customized command is unrelated to a die corresponding to the another operation command; and when determining that the customized command is unrelated to the die corresponding to the another operation command, directly delivers the customized command to a DCS module in a corresponding channel; or when determining that the customized command is related to the die corresponding to the another operation command, delivers the customized command to the DCS module in the corresponding channel after the operation command related to the customized command is executed.

The result return queue group includes a high-priority result return queue and a low-priority result return queue, and the result return queue is used to store a response result that is reported by a lower layer and that is of the operation command. To be specific, an execution result of a command stored in the high-priority result return queue is preferentially reported to the channel management module 110, and the channel management module 110 reports the execution result to a command management module at an upper layer.

When returning the response result of the command, the DCS module 121 needs to push the returned execution result to result return queues of different priorities based on a requirement of the command on a latency after the operation command is executed, and returns the execution result to the processing unit 122. The processing unit 122 reports the returned execution result to the command management module at the upper layer.

Referring to FIG. 2, the DCS module 121 may further include a round robin schedule (RR for short) unit, a schedule finite state machine (SM for short) unit, and a command buffering interface, and each command distribution queue group further includes a priority determining unit p.

The priority determining unit p sequentially reads operation commands in command distribution queues based on priorities of the command distribution queues in the command distribution queue group, and sends the read operation command to the RR unit.

The RR unit is configured to: schedule commands in the command distribution queues; and send the scheduled commands to the schedule FSM unit.

The schedule FSM unit buffers the commands scheduled by the RR unit to the command buffering management module 130 by using the command buffering interface.

The schedule FSM unit is further configured to: receive execution results of the commands returned by the FAA module 122; and store the execution results to the result return queues in the result return queue group based on priorities of the execution results.

In conclusion, the DCS module can sort the commands based on the priorities and can perform concurrent scheduling on a plurality of command distribution queues, and performance of command scheduling is improved.

In addition, the DCS module may further be combined with the processing unit, to set depth of the command distribution queue to be relatively small, so that a customized special command processed by using the processing unit can be relatively quickly stored to the command distribution queue, and therefore the customized special command can be scheduled in a relatively timely manner.

FIG. 3 is a schematic structural diagram of an FAA module according to an embodiment of this application. The FAA module 122 implements programmability of operation steps of a flash operation command by using the first type microcode in the NCS memory storage module 150.

The DCS module 121 sends the scheduled operation command to the FAA module 122. The FAA module 122 parses the operation command, and obtains a command parameter of the operation command from the DCS module 121, for example, an NCS memory location. Optionally, the DCS module 121 sends the operation command to the FAA module 122 by using an FCmd_Rep interface. The FAA module 122 obtains, by using an Inst_Ptr interface or a Link_Ptr interface of the DCS module 121, the NCS memory location indicated by the operation command.

The FAA module 122 performs abstract decomposition on operation steps of various operation commands scheduled by the DCS module 121, where a decomposed fine-grain operation behavior can cover command behaviors of all different flash media by using a minimum set; and then performs index encoding on the decomposed fine-grain operation, so that each fine-grain operation respectively corresponds to second type microcode in the PTG memory storage module; and performs microcode programming on the various operation commands based on the encoding. In addition, value selection and execution of microcode in the NCS memory storage module 150 are determined behaviors, and the microcode program is executed in a pipeline manner, so that a performance requirement for delivering the operation command can be ensured.

Data stored in the NCS memory storage module 150 is classified into two parts: programmable first type microcode and parameters.

The programmable first type microcode can adapt to various parsing procedures of flash operation commands. For different flash parsing procedures, a logic or a parameter of the first type microcode in the NCS memory storage module 150 can be modified, so that when there are different processing procedures, a flash adapting to the flash interface controller can adapt to the different processing procedures without changing a hardware logic.

The NCS memory storage module 150 may perform some special parameter configurations on different flash units based on different configuration parameters of characteristics of a flash currently adapting to the flash interface controller, so that the flash interface controller can adapt to different flashes by modifying the parameters in the NCS memory storage module 150.

A processing logic of the FAA module 122 may include three parts, namely, instruction parsing of the first type microcode, controlling of the data access controller, and PTG command delivery, and the data access controller described herein may be a direct memory access (DMA for short) controller.

When performing the instruction parsing by using the first type microcode, the FAA module 122 obtains an access address of the NCS memory storage module 150 from an NCS memory location indicated by the operation command delivered by the DCS module 121 (that is, a start address of the first type microcode in the NCS memory storage module 150 corresponding to the operation command delivered by the DCS module 121), and executes the corresponding first type microcode based on the access address. Optionally, an instruction fetch unit of the FAA module 122 obtains, from the Inst_Ptr interface or the Link_Ptr interface of the DCS module 121, the NCS memory location indicated by the operation command. After obtaining the NCS memory location, the instruction fetch unit reads the first type microcode corresponding to the NCS memory location from the NCS memory storage module 150, and sends the read first type microcode to a decoding unit. The decoding unit decodes the first type microcode, and the decoding unit sends the decoded first type microcode to an execution unit. The execution unit reads a corresponding parameter from the NCS memory storage module 150, and executes, by using the read parameter, the first type microcode decoded by the decoding unit.

Optionally, the NCS memory storage module 150 is provided with an Instruction Read interface and a Parameter Read interface, and the instruction fetch unit may read the first type microcode from the NCS memory storage module 150 by using the Instruction Read interface. The execution unit may read the parameter from the NCS memory storage module 150 by using the Parameter Read interface.

For an instruction that requires an external interface, the first type microcode is converted into a data structure required by a data management controller of an external interface or the PTG module 123 after the first type microcode is executed, to operate an external interface module.

For an instruction that requires a response from the external interface module, the instruction needs to be returned to a kernel of the first type microcode after being processed by the external interface module. In this case, the first type microcode can only be serially executed. For an instruction that does not require a response from the external interface, waiting for an execution status of the instruction is not needed, thereby satisfying a high performance requirement.

When controlling the data management controller, the FAA module 122 determines, based on a current command type, whether the data access controller needs to be operated.

When a write operation needs to be performed, that is, the operation command is a write command, the FAA module 122 is further configured to send a read request corresponding to the operation command to the data access controller, where the read request is used to trigger the data access controller to read data corresponding to the operation command from a data storage medium and return the read data to the FAA module 122; and the FAA module 122 is further configured to store the data obtained by the data access controller to the data buffering management module 140. Optionally, when a flash write control unit determines that the operation command is a write command, the flash write control unit controls a sequence control unit in the FAA module 122 to send a read request to the data management controller by using a Cmd Cpl interface of the data management controller. Correspondingly, the data management controller sends an acknowledgement of the read request to the FAA module 122 by using a Cmd Rep interface. Optionally, the sequence control unit sends data in the acknowledgement to a flash read control unit, and the flash read control unit writes the obtained data into the data buffering management module 140 by using a flash Rdata interface of the data buffering management module 140.

When a read operation needs to be performed, that is, when the operation command is a read command, the FAA module 122 is further configured to: store data corresponding to the operation command read from the flash by the PTG module 123 to the data buffering management module 140; read the data corresponding to the operation command from the data buffering management module 140; and send a write request carrying the data to the data access controller. The write request is used to trigger the data access controller to write the data into the data storage medium. Optionally, the FAA module 122 may send the write request to the data management controller by using an FDat Cpl interface of the data management controller. Correspondingly, the data management controller sends an acknowledgement of the write request to the FAA module 122 by using a FDat Rep interface. Optionally, the flash write control unit in the FAA module 122 reads the data by using a flash Wdata interface of the data buffering management module 140, and sends the read data to the sequence control unit. The sequence control unit sends the write request carrying the read data to the data management controller by using the FDat Cpl interface of the data management controller. Correspondingly, the data management controller sends an acknowledgement of the write request to the sequence control unit by using the FDat Rep interface.

When delivering the index command of the operation command to the PTG module 123, after performing instruction parsing on the first type microcode, the FAA module 122 sends a corresponding index command to the PTG module 123 for an instruction that needs to be operated in the flash. The index command herein is used to index corresponding second type microcode stored in the PTG memory storage module 160. Likewise, for an instruction that does not require a state from by the PTG module 123, the instruction may be executed in a pipeline manner, thereby improving execution efficiency of the instruction. Optionally, a flash instruction control unit in the FAA module 122 may send the parsed index command to the PTG module 123 by using a PHY Rdata interface of the PTG module 123.

FIG. 4 is a schematic structural diagram of a PTG module according to an embodiment of this application.

The PTG module 123 implements timing programmability of each flash 10 interface by using the second type microcode in the PTG memory storage module 160. The PTG memory storage module 160 defines timing corresponding to each index command, and encodes the timing in a form of the second type microcode. Such type of timing may also be referred to as a flash bus operation.

After receiving the index command output by the FAA module 122, the PTG module 123 addresses second type microcode of the corresponding timing in the PTG memory storage module 160 by using the index command. After the second type microcode is parsed, various flash timing required by the flash interface is generated. The microcode in the PTG memory storage module 160 allows a user to adjust a corresponding timing parameter in the microcode to satisfy a micro variation requirement on timing after flash evolvement. This avoids that adaption to the flash is not supported because a timing parameter is not defined in advance.

The PTG module 123 receives the index command delivered by the FAA module 122, and executes second type microcode in a flash bus of the PTG memory storage module 160 in a pipeline manner based on second type microcode mapped into the PTG memory storage module 160 by the index command, and controls, based on a clock cycle, behaviors of a chip enable (CE for short), an address latch enable (ALE for short), a command latch enable CLE for short), a write enable (WE for short), a read enable (RE for short), a data strobe (DQS for short), and a data bus (DQ for short) signal of the flash PHY module 124, to implement a flash 10 programmability operation and satisfy a high performance requirement of the flash interface. For a data sending command, an internal data read path (Wdata Path) and a data write path (Rdata Path) are started, to complete data transmission of the data buffering management module 140 and the flash PHY module 124. For example, the PTG module 123 starts the data read path to read data from the data buffering management module 140, and converts the read data into timing by using the second type microcode in the PTG memory storage module 160. The data write path adapts to a write buffering interface (Flash Wdata shown in FIG. 3) of the data buffering management module 140, and the data read path adapts to a read buffer interface (Flash Rdata shown in FIG. 3) of the data buffering management module 140.

In conclusion, a processing unit is added to the flash interface controller provided in this embodiment of this application. The processing unit can set a special customized command based on a status of a die, and a special operation such as die latch can be implemented. In addition, because the processing unit is a low power processing unit that does not need to occupy a relatively large area, an area of the flash interface controller does not need to be excessively enlarged.

In addition, the flash interface controller further has the NCS memory storage module that stores the first type microcode and the PTG memory storage module that stores the second type microcode. An operation command complying with any protocol can be parsed into a flash bus operation that can be identified by the flash bus, thereby well balancing flexibility and performance of the flash interface controller, comprehensively adapting to a requirement of continuous change of flash granularity characteristic evolvement, and laying a solid technical foundation for supporting an overall success of all future flash policies in an IT product line.

Figure 5:
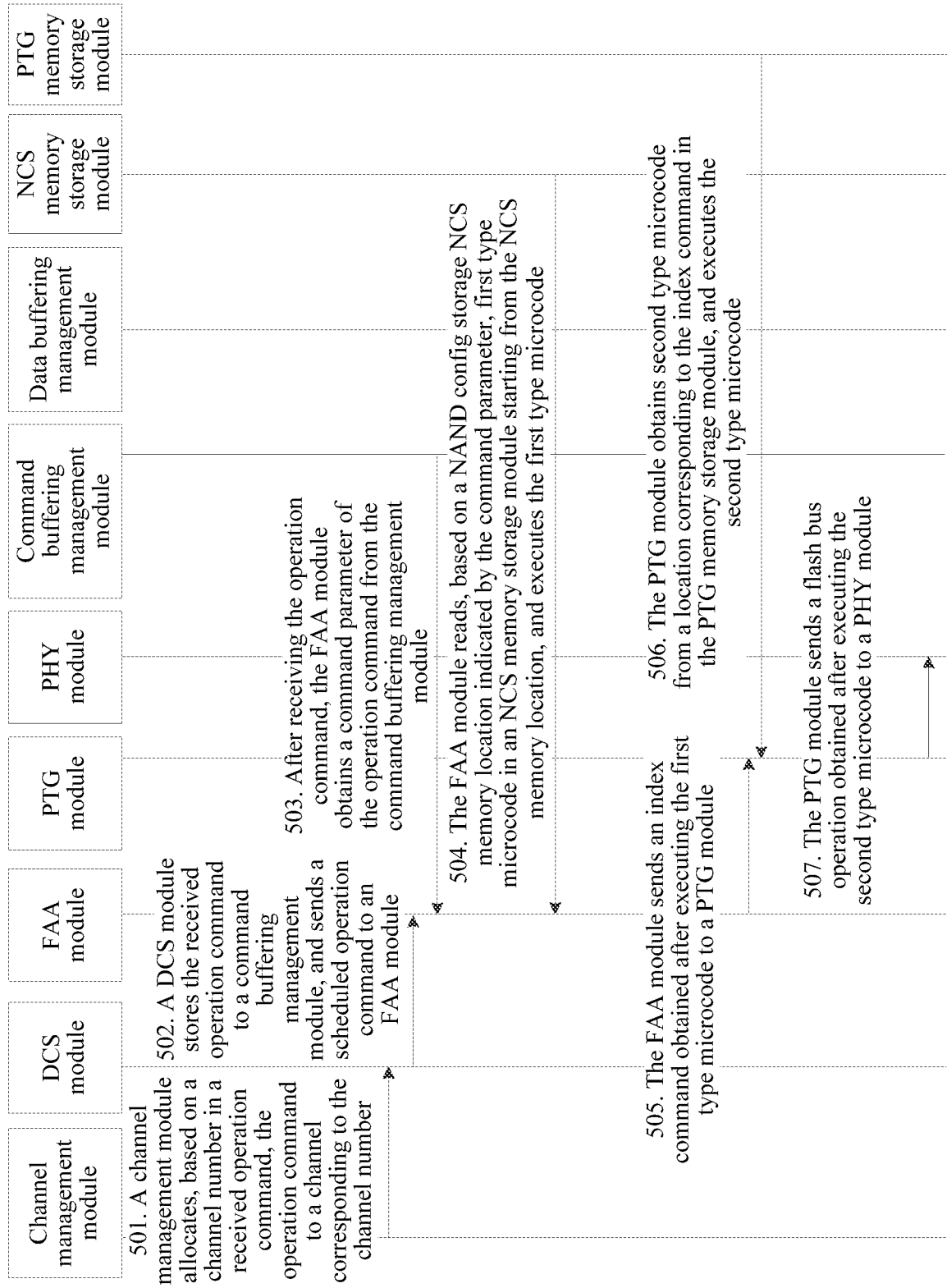
FIG. 5 is a flowchart of an operation command processing method according to an embodiment of this application.

FIG. 5 is a flowchart of an operation command processing method according to an embodiment of this application. The operation command processing method is applied to the flash interface controller shown in FIG. 1, and the operation command processing method includes the following steps.

Step 501. A channel management module allocates, based on a channel number in a received operation command, the operation command to a channel corresponding to the channel number.

Usually, the channel management module includes a channel management unit and a low power processing unit, and the low power processing unit described herein may be a low power CPU.

The channel management unit allocates, based on the channel number in the received operation command, the operation command to the channel corresponding to the channel number. In some special cases, the processing unit may deliver a customized command to a DCS module in a corresponding channel.

For other functions of the processing unit, refer to the descriptions of the processing unit in FIG. 1 and FIG. 2. This is not described herein again.

Step 502. A DCS module stores the received operation command to a command buffering management module, and sends a scheduled operation command to an FAA module.

For the units and queue groups included in the DCS module, refer to the descriptions in FIG. 2. For the actions performed by the DCS module in step 502, also refer to the descriptions of the unit operations of the DCS module in FIG. 2. These are not described herein again.

Step 503. After receiving the operation command, the FAA module obtains a command parameter of the operation command from the command buffering management module.

Step 504. The FAA module reads, based on a NAND config storage NCS memory location indicated by the command parameter, first type microcode in an NCS memory storage module starting from the NCS memory location, and executes the first type microcode.

Step 505. The FAA module sends an index command obtained after executing the first type microcode to the PTG module.

For the structure unit in the FAA module, refer to FIG. 3. For the actions performed by the FAA module in step 503 to step 505, also refer to the descriptions of the unit operations of the FAA module in FIG. 3. These are not described herein again.

Step 506. The PTG module obtains second type microcode from a location corresponding to the index command in the PTG memory storage module, and executes the second type microcode.

Step 507. The PTG module sends a flash bus operation obtained after executing the second type microcode to a PHY module.

For the structure unit in the PTG module, refer to FIG. 4. For the actions performed by the PTG module in step 506 and step 507, also refer to the descriptions of the unit operations of the PTG module in FIG. 4. These are not described herein again.

The PHY module sends the flash bus operation to a flash bus.

The physical layer interface module described herein is the foregoing flash PHY module 124. For specific implementation, refer to the descriptions of the PHY module 124.

In conclusion, in the operation command processing method provided in this embodiment of this application, the programmable first type microcode and second type microcode are introduced to the flash interface controller, and the first type microcode can be modified through programming to adapt to a procedure of parsing the operation command of a new protocol, and the second type microcode can be modified through programming to adapt to a flash bus operation required by a new flash interface standard. An operation command can be parsed by only fixing logics of physical modules in the flash interface controller and reading first type microcode and second type microcode that are related to the operation command. Therefore, various protocols and flash interface standards can be adapted to, and flexibility is good.

In addition, the channel management module is provided with a low power processing unit. In a special case, a customized special command can be delivered to the channel, to satisfy some special requirements. In addition, the low power processing unit occupies a relatively small area, thereby avoiding unnecessary enlargement of an area occupied by the flash interface controller.

When determining that the customized command is related to the die of the another operation command, the processing unit delivers the customized command to a DCS module in a corresponding channel only after all the operation commands are executed, thereby ensuring accuracy of performing an operation on the die by using the customized command.

The DCS module is provided with command distribution queues of different priorities, and the channel management module may allocate a high-priority operation command to the high-priority command distribution queue of the DCS module, thereby ensuring that the high-priority operation command can be preferentially scheduled. By storing an execution result of the high-priority operation command to the high-priority result return queue, an upper layer can learn of the execution result of the high-priority operation command as fast as possible.

The FAA module may store the currently read NCS memory location of the microcode as the command parameter of the operation command to the command buffering management module when the operation command is in the operation busy time, so that when the operation command is scheduled again, the previously-recorded NCS memory location of the operation command can be read from the command buffering management module, to continue to read and execute remaining microcode, thereby avoiding to repeatedly execute the microcode that has been executed, and ensuring a speed of executing microcode of the operation command.

The first type microcode can match the command parameter of the operation command. When a protocol of the operation command changes, the first type microcode is modified based on only a command parameter of the operation command whose protocol changes, thereby implementing flexible adaption to the protocol. In addition, the second type microcode can match a parameter required by the flash bus interface. When a flash bus interface standard changes, the second type microcode is modified based on only the parameter required by the flash bus interface, thereby implementing flexible adaption to the flash bus interface standard.

Unless otherwise defined, a technical term or a scientific term used herein should have a general meaning understood by persons of ordinary skill in the art of the present invention. In the specification and claims of the patent application of the present invention, the terms "first", "second", and the like are not intended to indicate any order, quantity, or significance, but are intended to distinguish between different components. Likewise, "a/an", "one", or the like is not intended to indicate a quantity limitation either, but is intended to indicate existing at least one. "Connection", "link" or the like is not limited to a physical or mechanical connection, but may include an electrical connection, whether directly or indirectly.

The sequence numbers of the foregoing embodiments of this application are merely for illustrative purposes, and are not intended to indicate priorities of the embodiments.

Persons of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A flash interface controller, wherein the flash interface controller comprises: a channel management module, a channel, a command buffering management module, a data buffering management module, a non-linear NAND config storage (NCS) memory, and a programmable timing generator (PTG) memory, the channel comprises a die concurrent schedule (DCS) module, a flash access agent (FAA) module, a (PTG) module, and a physical layer interface module, and the channel management module is configured to allocate, based on a channel number in a received operation command, the operation command to a channel corresponding to the channel number;

the DCS module in the channel is configured to: store the received operation command to the command buffering management module; and send a scheduled operation command in the received operation commands to the FAA module;

the FAA module is configured to: obtain a command parameter of the operation command from the command buffering management module after receiving the operation command; read, based on a NAND config storage NCS memory location indicated by the command parameter, first type microcode starting from the NCS memory location in the NCS memory, and execute the first type microcode; and send an index command obtained after executing the first type microcode to the PTG module;

the PTG module is configured to: read second type microcode from a location that corresponds to the index command and that is in the PTG memory, and execute the second type microcode; and send a flash bus operation obtained after executing the second type microcode to the physical layer interface module; and the physical layer interface module is configured to send the flash bus operation to a flash bus.

2. The flash interface controller according to claim 1, wherein the channel management module comprises a channel management unit and a processing unit, and the channel management unit is configured to allocate, based on the channel number in the received operation command, the operation command to the channel corresponding to the channel number; and the processing unit is configured to deliver a customized command to the DCS module in the corresponding channel, wherein the customized command is a command generated when special processing needs to be performed on a die, and the special processing does not comprise a write operation, a read operation, or an erase operation.

3. The flash interface controller according to claim 2, wherein the processing unit is further configured to directly deliver the customized command to the DCS module in the corresponding channel when determining that the customized command is unrelated to a die corresponding to another operation command; and the processing unit is further configured to: when determining that the customized command is related to the die corresponding to the another operation command, deliver the customized command to the DCS module in the corresponding channel after the operation command related to the customized command is executed.

4. The flash interface controller according to claim 1, wherein the DCS module comprises at least one command distribution queue group, each command distribution queue group comprises a high-priority command distribution queue and a low-priority command distribution queue, and a command stored in the high-priority command distribution queue in the same command distribution queue group is preferentially scheduled; and the channel management module is further configured to: determine, based on a priority of the operation command and execution results that are of the operation commands and that are fed back by the DCS module, a target command distribution queue in the DCS module that matches the priority of the operation command and that has an idle storage location; and allocate the operation command to the target command distribution queue.

5. The flash interface controller according to claim 1, wherein the DCS module comprises a group of result return queue group, the result return queue group comprises a high-priority result return queue and a low-priority result return queue, and an execution result of a command stored in the high-priority result return queue is preferentially reported to the channel management module.

6. The flash interface controller according to claim 1, wherein when the operation command is a write command, the FAA module is further configured to send a read request corresponding to the operation command to a data access controller, wherein the read request is used to trigger the data access controller to read data corresponding to the operation command from a data storage medium and return the read data to the FAA module; and the FAA module is further configured to store the data obtained by the data access controller to the data buffering management module; and when the operation command is a read command, the FAA module is further configured to: store data that corresponds to the operation command and that is read by the PTG module from the flash to the data buffering management module; read the data corresponding to the operation command from the data buffering management module; and send a write request carrying the data to the data access controller, wherein the write request is used to trigger the data access controller to write the data into the data storage medium.

7. The flash interface controller according to claim 1, wherein the FAA module is further configured to: when the operation command is in an operation busy time, store an intermediate state of the operation command and a currently read NCS memory location of the first type microcode as command parameters of the operation command to the command buffering management module; and the FAA module is further configured to: when the operation command is scheduled by the DCS module again, obtain the previously-recorded NCS memory location of the operation command from the command buffering management module; continue to read the first type microcode starting from the NCS memory location in the NCS memory, and execute the first type microcode; and when all first type microcode that corresponds to the operation command is executed, obtain a command result of the operation command and return the command result to the DCS module.

8. The flash interface controller according to claim 1, wherein the physical layer interface module is further configured to: determine whether the received flash bus operation is a bus operation of a double data rate DDR interface; and send the flash bus operation to the flash bus when the received flash bus operation is a bus operation of a non-DDR interface; or when the received flash bus operation is a bus operation of a DDR interface, convert the flash bus operation into double data rate data and send the double data rate data to the flash bus.

9. The flash interface controller according to claim 1, wherein the first type microcode stored in the NCS memory and the second type microcode stored in the PTG memory are configured during power on, the first type microcode matches the command parameter of the operation command, and the second type microcode matches a parameter required by a flash bus interface.

10. An operation command processing method, applied to a flash interface controller, wherein the flash interface controller comprises: a channel management module, a channel, a command buffering management module, a data buffering management module, a non-linear (NAND) config storage (NCS) memory, and a programmable timing generator (PTG) memory, and the channel comprises a die concurrent schedule (DCS) module, a flash access agent (FAA) module, a (PTG) module, and a physical layer interface module, and the method comprises:

allocating, by the channel management module based on a channel number in a received operation command, the operation command to a channel corresponding to the channel number;

storing, by the DCS module in the channel, the received operation command to the command buffering management module; and sending a scheduled operation command in the received operation commands to the FAA module;

obtaining, by the FAA module, a command parameter of the operation command from the command buffering management module after receiving the operation command; reading, based on a NAND config storage NCS memory location indicated by the command parameter, first type microcode starting from the NCS memory location in the NCS memory, and executing the first type microcode; and sending an index command obtained after executing the first type microcode to the PTG module;

reading, by the PTG module, second type microcode from a location that corresponds to the index command and that is in the PTG memory, and executing the second type microcode; and sending a flash bus operation obtained after executing the second type microcode to the physical layer interface module; and sending, by the physical layer interface module, the flash bus operation to a flash bus.

11. The operation command processing method according to claim 10, wherein the channel management module comprises a channel management unit and a processing unit, and the allocating, by the channel management module based on a channel number in a received operation command, the operation command to a channel corresponding to the channel number comprises:

allocating, by the channel management unit based on the channel number in the received operation command, the operation command to the channel corresponding to the channel number; and the method further comprises:

delivering, by the processing unit, a customized command to the DCS module in the corresponding channel, wherein the customized command is a command generated when special processing needs to be performed on a die, and the special processing does not comprise a write operation, a read operation, or an erase operation.

12. The operation command processing method according to claim 11, wherein the method further comprises:

directly delivering, by the processing unit, the customized command to the DCS module in the corresponding channel when determining that the customized command is unrelated to a die corresponding to another operation command; and when determining that the customized command is related to the die corresponding to the another operation command, delivering, by the processing unit, the customized command to the DCS module in the corresponding channel after the operation command related to the customized command is executed.

13. The operation command processing method according to claim 10, wherein the DCS module comprises at least one command distribution queue group, each command distribution queue group comprises a high-priority command distribution queue and a low-priority command distribution queue, and a command stored in the high-priority command distribution queue in the same command distribution queue group is preferentially scheduled; and the method further comprises:

determining, by the channel management module based on a priority of the operation command and execution results that are of the operation commands and that are fed back by the DCS module, a target command distribution queue in the DCS module that matches the priority of the operation command and that has an idle storage location; and allocating the operation command to the target command distribution queue.

14. The operation command processing method according to claim 10, wherein the DCS module comprises a group of result return queue group, the result return queue group comprises a high-priority result return queue and a low-priority result return queue, and an execution result of a command stored in the high-priority result return queue is preferentially reported to the channel management module.

15. The operation command processing method according to claim 10, wherein the method further comprises:

when the operation command is a write command, sending, by the FAA module, a read request corresponding to the operation command to a data access controller, wherein the read request is used to trigger the data access controller to read data corresponding to the operation command from a data storage medium and return the read data to the FAA module; and storing, by the FAA module, the data obtained by the data access controller to the data buffering management module; and when the operation command is a read command, storing, by the FAA module, data that corresponds to the operation command and that is read by the PTG module from the flash to the data buffering management module; reading the data corresponding to the operation command from the data buffering management module; and sending a write request carrying the data to the data access controller, wherein the write request is used to trigger the data access controller to write the data into the data storage medium.

16. The operation command processing method according to claim 10, wherein the method further comprises:

when the operation command is in an operation busy time, storing, by the FAA module, an intermediate state of the operation command and a currently read NCS memory location of the first type microcode as command parameters of the operation command to the command buffering management module; and when the operation command is scheduled by the DCS module again, obtaining, by the FAA module, the previously-recorded NCS memory location of the operation command from the command buffering management module; continuing to read the first type microcode starting from the NCS memory location in the NCS memory, and executing the first type microcode; and when all first type microcode that corresponds to the operation command is executed, obtaining a command result of the operation command and returning the command result to the DCS module.

17. The operation command processing method according to claim 10, wherein the method further comprises:

determining, by the physical layer interface module, whether the received flash bus operation is a bus operation of a double data rate DDR interface; and sending the flash bus operation to the flash bus when the received flash bus operation is a bus operation of a non-DDR interface; or when the received flash bus operation is a bus operation of a DDR interface, converting the flash bus operation into double data rate data and sending the double data rate data to the flash bus.

18. The operation command processing method according to claim 10, wherein the first type microcode stored in the NCS memory and the second type microcode stored in the PTG memory are configured during power on, the first type microcode matches the command parameter of the operation command, and the second type microcode matches a parameter required by a flash bus interface.

19. A computer-readable storage medium, wherein the storage medium stores at least one instruction, and the instruction is loaded by a flash interface controller and is configured to perform an operation command processing method which is applied to a flash interface controller, wherein the flash interface controller comprises: a channel management module, a channel, a command buffering management module, a data buffering management module, a non-linear (NAND) config storage (NCS) memory, and a programmable timing generator (PTG) memory, and the channel comprises a die concurrent schedule (DCS) module, a flash access agent (FAA) module, a (PTG) module, and a physical layer interface module, and the method comprises:
  allocating, by the channel management module based on a channel number in a received operation command, the operation command to a channel corresponding to the channel number;
  storing, by the DCS module in the channel, the received operation command to the command buffering management module; and sending a scheduled operation command in the received operation commands to the FAA module;
  obtaining, by the FAA module, a command parameter of the operation command from the command buffering management module after receiving the operation command; reading, based on a NAND config storage NCS memory location indicated by the command parameter, first type microcode starting from the NCS memory location in the NCS memory, and executing the first type microcode; and sending an index command obtained after executing the first type microcode to the PTG module;
  reading, by the PTG module, second type microcode from a location that corresponds to the index command and that is in the PTG memory, and executing the second type microcode; and sending a flash bus operation obtained after executing the second type microcode to the physical layer interface module; and
  sending, by the physical layer interface module, the flash bus operation to a flash bus.

20. The computer-readable storage medium according to claim 19, wherein the channel management module comprises a channel management unit and a processing unit, and the allocating, by the channel management module based on a channel number in a received operation command, the operation command to a channel corresponding to the channel number comprises:
  allocating, by the channel management unit based on the channel number in the received operation command, the operation command to the channel corresponding to the channel number; and
  the method further comprises:
  delivering, by the processing unit, a customized command to the DCS module in the corresponding channel, wherein the customized command is a command generated when special processing needs to be performed on a die, and the special processing does not comprise a write operation, a read operation, or an erase operation.

* * * * *